Figure 1:
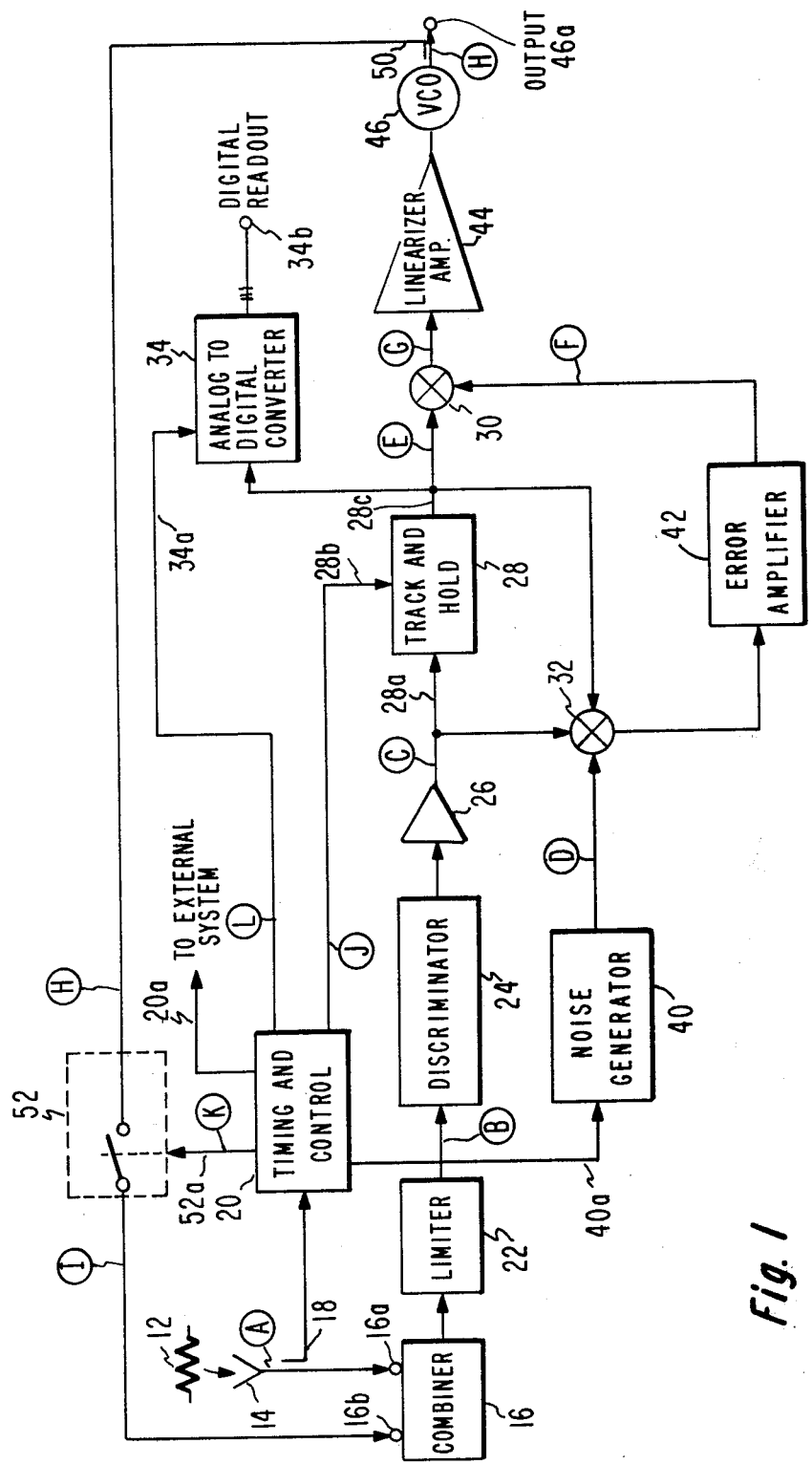

United States Patent [19]

Mawhinney

[11] 4,247,946
[45] Jan. 27, 1981

[54] SMART NOISE GENERATOR

[75] Inventor: Daniel D. Mawhinney, Livingston, N.J.

[73] Assignee: RCA Corporation, New York, N.Y.

[21] Appl. No.: 105,109

[22] Filed: Dec. 19, 1979

[51] Int. Cl.³ .............................................. H04K 3/00
[52] U.S. Cl. ......................................... 455/1; 331/78; 343/18 E
[58] Field of Search .................... 455/1, 264, 258, 263; 343/18 E; 331/1 R, 11, 14, 78

[56] References Cited

U.S. PATENT DOCUMENTS

| | | | |
|---|---|---|---|
| 4,017,856 | 4/1977 | Wiegand | 343/18 E |
| 4,063,188 | 12/1977 | Mawhinney | 331/11 |
| 4,103,236 | 7/1978 | Deserno et al. | 455/1 |

Primary Examiner—Jin F. Ng
Attorney, Agent, or Firm—Samuel Cohen; Robert L. Troike; Raymond E. Smiley

[57] ABSTRACT

A frequency memory system having a smart noise component is receptive of an RF burst signal of a given frequency and of relatively short duration for determining the frequency and storing a signal of amplitude indicative of the given frequency and for producing by means of a voltage controlled oscillator (VCO) a signal at the given frequency of relatively long duration. The stored signal and a signal for amplitude corresponding to the actual frequency produced by VCO are utilized to produce an error signal to correct any error in the frequency of the signal produced by the VCO relative to the given frequency. Since the VCO is not capable of immediately accurately tracking the input frequency, a smart noise generator produces a signal of random amplitude which is added to the error signal to cause the VCO to produce at least a frequency component of its output signal which is equal to that of the input RF burst signal.

10 Claims, 3 Drawing Figures

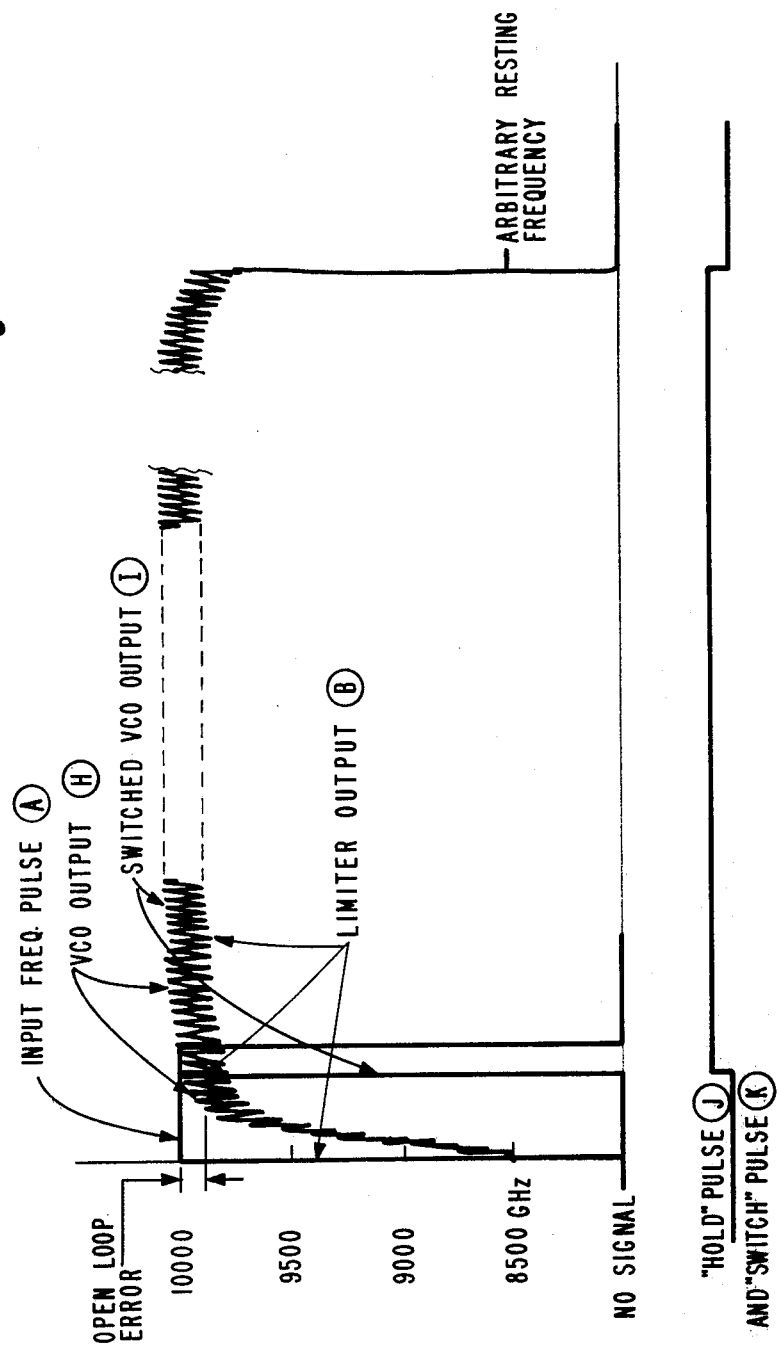

SMART NOISE GENERATOR

The Government has rights in this invention pursuant to Contract No. N00039-76-C-0280 awarded to the Department of the Navy.

The invention relates to voltage controlled oscillator (VCO) systems and more particularly to VCO systems used in frequency memory systems with smart noise generators.

There are presently in use several types of electronic systems whose function is to provide a continuous wave output at the same frequency as the received signal where the received signal is a short duration RF (radio frequency) burst such as from a radar. These systems sometimes referred to as frequency memory systems must be capable of tuning to a given frequency within a fairly broad range of frequencies rapidly and accurately. One commonly used system employs a microwave delay line and a broadband amplifier, such as a traveling wave tube, in which the incoming RF burst signal is recirculated many times to produce a practically continuous output. Another approach is the use of a set-on voltage controlled oscillator (VCO) in a system where a discriminator produces a voltage related to the frequency of the incoming signal, a sample and hold circuit is used to store this voltage (memory), and a VCO is tuned by this stored voltage. The accuracy of this system is determined by the discriminator and the VCO transfer characteristics and the memory time is limited by the sample-and-hold circuit storage time and the VCO drift. In the usual VCO system, the discriminator output is amplified and shaped so as to match the discriminator to that of the VCO tuning curve and to tune the VCO to the same frequency as the incoming signal. The accuracy of the set-on voltage to tune the VCO is limited by the calibration of the discriminator and the VCO and the changes in the operating characteristics of the discriminator and the VCO caused by variation in ambient temperatures and power supplies.

In conventional set-on VCO memory systems, the incoming signal is discriminated and the resulting output voltage is stored in the memory such as the sample and hold circuit. Because the discriminator calibration is limited in accuracy and resolution, the stored voltage is inaccurate to some degree. The problem is compounded by the fact that the incoming signal will be varying in amplitude unless major limiting and leveling accessories are added to the system. Furthermore, additional error is produced by drift or instability of the VCO after the stored output voltage is applied.

One prior art system disclosed by the instant inventor in U.S. Pat. No. 4,063,188 over which the instant invention is an improvement, utilizes a VCO circuit to achieve an output frequency which is approximately the same frequency as the input frequency but utilizes rather complex circuitry including a sample-and-hold circuit and switch means which have proven troublesome in operation.

In accordance with a preferred embodiment of the invention, a system for generating an RF output signal of relatively long duration at the same frequency as a received relatively short duration RF input signal having a leading edge and lasting until a time T thereafter comprises a first means responsive to the RF input signal for providing a first output signal of amplitude corresponding to the frequency of the input RF signal, a second means responsive to the first means, first output signal for producing a first output signal corresponding to the amplitude of the first means first output signal until a time t after the occurrence of the leading edge during receipt by the first means of the input RF signal and for thereafter producing a first output signal corresponding to the amplitude of the first means, first output signal at the end of time t, where $t \leq T$. The system also comprises third means responsive to the first and second signals produced by the second means for producing the output RF signal, the frequency of which, is ideally identical to the frequency of the input RF signal but, due to system tolerance, is usually not identical thereto. The system also includes fourth means responsive to the output RF signal from the third means after time t for applying the output frequency signal rather than the input frequency signal to the first means for causing it to produce a second output signal, the amplitude of which corresponds to the frequency of the output RF signal. Further, the system includes an error correcting means responsive to the first means, second output signal and second means, second output signal for producing a difference signal. The third means is responsive to the difference signal for correcting the frequency of the output RF signal to the frequency of the input RF signal.

Figure 2:
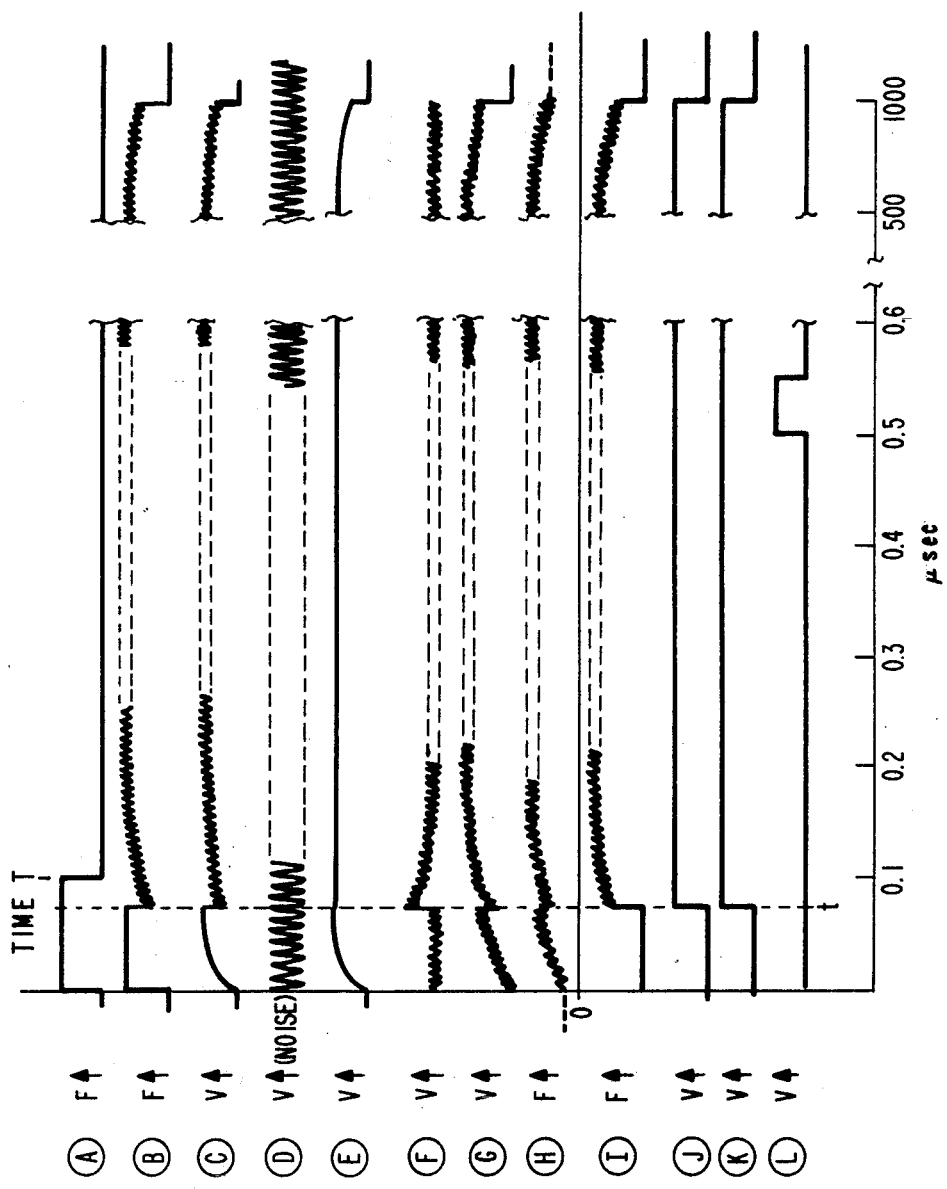

In the drawing:

FIG. 1 is a block diagram of a frequency memory system of the smart noise generator type in accordance with a preferred embodiment of the invention; and FIGS. 2 and 3 are sets of waveforms useful in understanding the operation of the FIG. 1 system.

Referring to FIG. 1, an RF (radio frequency) burst signal from a source (not shown) and of freuqency and duration initially not known is received by a suitable antenna 14. The burst and others which follow typically may be produced and transmitted by an enemy tracking radar. A succession of RF burst signals similar to signal 12 are received serially at antenna 14. The frequency of all burst signals may be the same or may differ from one to another. The typical frequency of the burst signals ranges from 8,000 to 10,000 GHz and the typical duration, T, is at least 100 nanoseconds and may be on the order of 1 microsecond or more.

Antenna 12 is coupled to coupler 18 which passes a sample of the signal received at antenna 14 to a timing and control circuit (T/C) 20 which is responsive to the leading edge of each RF burst signal for starting a timer. The timer causes pulses to be reproduced thereafter at predetermined times to be described. Combiner 16 is coupled to a limiter 22 which passes to a discriminator 24, the stronger of the two signals received at terminals 16a and 16b of combiner 16.

Discriminator 24 produces a voltage, the amplitude of which corresponds to the frequency of the signal supplied thereto which is initially burst 12. A suitable discriminator is disclosed in U.S. Pat. No. 4,053,842, issued Oct. 17, 1977, by Z. Turski, et al. Discriminator 24 is coupled to an amplifier 26 for amplifying the signals produced by the discriminator. The amplifier 26 is coupled to one input terminal of a first summing circuit 32 and by an input line 28a to a track and hold circuit (T/H) 28.

T/H initially tracks the output voltage from amplifier 26 which follows the output voltage of discriminator 24 and passes that voltage to output line 28c. When a control signal is received on line 28b from T/C 20, T/H 28 enters a hold mode and passes to line 28c the voltage being tracked at the time the control signal is received.

The output of T/H 28 is coupled to first summing circuit 32, to a second summing circuit 30 and to an analog-to-digital converter 34 which is also coupled to receive a timing control signal on line 34a from T/C 20. When a pulse of appropriate polarity is present on line 34a, converter 34 produces at its output terminal 34b, a digital readout corresponding to the voltage present at track and hold circuit 28.

A noise generator 40 is coupled to a third input terminal of summing circuit 32. Noise generator 40 may comprise a simple noisy diode and appropriate operational amplifier circuits for amplifying the noise produced by the diode. A control signal from T/C 20 is applied to noise generator 40 on line 40a l *to turn on the noise generator at the time that the leading edge of RF burst 12 occurs. Generator 40 produces so called "white-noise."*

The summing circuit 32 is coupled to an error amplifier 42, which is, in turn, coupled to an input terminal of summing circuit 30. The output of summing circuit 30 is coupled to a linearizer amplifier 44 of conventional design which is, in turn, coupled to a voltage control oscillator (VCO) 46. A type of linearizer amplifier useful as amplifier 44 is described in "Build a High-Accuracy Waveshaping Circuit Using Inexpensive Parts," by H. G. Riekers in *EDN*, June 1, 1972, pp. 36 and 37.

VCO 46 produces at output terminal 46a, a frequency corresponding to the voltage supplied to the VCO 46. The output frequency is, however, not a linear function of the input voltage and for that reason linearizer amplifier 44 is employed to provide necessary compensation between the voltage be supplied by summing circuit 30 and that desired by VCO 46. Output terminal 46a is coupled to circuitry (not shown) of convention design such as electronic warfare type circuitry for producing and transmitting false radar location information back to an enemy radar system producing the RF burst 12.

The electronic warfare equipment might include so called pull-away circuits to provide false signal to an enemy tracking radar for causing the enemy tracking radar to believe that the equipment (airplane, ship or whatever) carrying the circuit of FIG. 1 is moving at a different speed or is at a different location than in fact is the actual speed and location of such equipment. All this is well known to those skilled in the state of the art of electronic warfare.

A sample of a signal produced at output terminal 46a is passed by a coupler 50 to a switch means. Switch means 52, although depicted schematically, as a single pole, single throw switch, may in fact be a PIN diode switch. The switch is coupled to an input terminal 16b of combiner 16. A control signal on line 52a from the T/C 20 controls the position of switch 52. The switch is normally opened, but after a preselected period following the receipt of the leading edge of RF burst 12 a signal produced by T/C 20 appears on line 52a, causing the switch 52 to be closed to thereby pass the frequency generated by VCO 46 to combiner 16b. The relative signal strengths of the signals applied at terminal 16a and 16b when both are present are such that the signal at terminal 16b is stronger than the signal at terminal 16a and is therefore passed by limiter 22 to discriminator 24.

Operation of the system of FIG. 1 will now be given with reference to the waveforms of FIG. 2 and 3. The encircled letters to the left of the waveforms in FIG. 2 and encircled letters at various places in FIG. 3 relate to the encircled letters in FIG. 1 and represent the waveforms appearing at the places indicated by the letters. In the description which follows, the number preceding the letter of a waveform refers to the particular figure (i.e. waveform 2B means waveform B, FIG. 2). In FIG. 2, four waveforms A,B,H, and I are plotted as frequency on the vertical axis versus time on the horizontal axis while the other waveforms are plotted as voltages on the vertical axis versus time on the horizontal aixs as indicated respectively by the noncircled letters, F and V with associated vertical arrows. The waveforms of frequency versus time (waveforms A,B,H, and I) are plotted to a larger vertical scale in FIG. 3 than in FIG. 2 and are superimposed.

In addition the hold pulse, waveform J, and switch pulse waveform K are also plotted in FIG. 3 for time comparison. Various portions of the frequency waveforms in FIG. 3 overlap. These portions are marked by arrows extending from the waveform descriptions.

A burst of RF energy from a source (not shown) is received at antenna 14, at which time switch 52 is open. Although it is not known a priori, the frequency and duration, T, of the burst signal as illustrated in waveform A, FIG. 3, (hereinafter waveform 3A) are assumed to be 10,000 GHz and 0.1 microseconds, respectively. At the leading edge of the burst illustrated as time O in FIGS. 2 and 3, T/C 20 begins to time and by means of line 40a turns on noise generator 40, the operation of which will be described shortly.

The RF burst passes through combiner 16 and limiter 22 into discriminator 24 where it is converted to a voltage and then is amplified by amplifier 26 to produce waveform 2C. Due to delays in various ones of the components, amplifier 26 does not immediately produce a voltage corresponding to the frequency of the RF burst. Rather it follows the curve illustrated in waveform 2C. As illustrated in waveform 2C for exemplary circuitry the voltage produced at amplifier 26, does reach a level corresponding to the frequency of the RF burst by a time t=0.075 microseconds, following initial receipt of the RF burst.

Temporarily, ignoring the effects of noise generator 40 and error amplifier 42, at time t, T/H 28 is tracking the voltage produced by amplifier 26. VCO 46 responds to the signal produced by amplifier 44 to produce a frequency (waveform 2H, waveform 3H) that ideally is identical to the frequency of RF burst 12. However, it will be noted from FIG. 3 that at time t, the frequency produced by the VCO 46 is not the same as the frequency of the RF burst, waveform A due to component errors of amplifier 44 and VCO 46.

At time t, T/H 28 is accurately tracking the voltage produced by amplifier 26 and amplifier 26 is producing a voltage which accurately corresponds to the frequency of the RF burst 12. Therefore, at time t, T/C 20 produces a pulse, waveform 2J, which causes T/H 28 to go into its hold mode thereby causing T/H 28 to continue to produce a voltage corresponding to the frequency of RF burst 12.

It should be noted that T/H 28 is capable of holding the voltage for about 500 to 1000 microseconds at which time the voltage begins to decay. This decay is illustrated in the right portion of waveform 2E. This time is well beyond the time of interest however.

Almost immediately after T/H 28 goes into its hold mode, T/C 20 causes switch 52 to close (waveform 2K) such that a sample of the frequency produced by VCO 46 is passed through combiner 16 and limiter 22 to discriminator 24. It will be remembered that the VCO frequency, when present, is dominant in power over the RF input frequency as they appear at combiner 16, and therefore limiter 20 causes only the frequency produced by the VCO 46 to be passed to discrimiator 24.

It will be assumed that at time t, as illustrated in waveform 2H and 3H, VCO 46 is producing a lower frequency than that of RF burst 12, although depending on the system parameters it could be producing a higher frequency than burst 12. Thus, at time t, there is a drop in voltage produced by amplifier 26. See waveform 2C. The voltage from amplifier 26 represents the actual frequency of VCO 46 and the voltage from T/H 28 represents the actual frequency of RF burst 12 and the desired frequency produced by VCO 46. These voltages are fed to a summing junction 32 which computes the error voltage thereof, waveform 2F. The "fuzzy" signal on waveform 2F is caused by noise generator 40 the effects of which are temporarily being ignored. Thus, the voltage out of summing junction 32 and the amplifier 42 represents the error between a desired frequency of VCO 46 and its actual frequency. This error voltage is applied to summing junction 30 where it is summed with the voltage from T/H 28 and applied by amplifier 44 to VCO 46. VCO 46 is thereby caused to produce, within about 0.5 microseconds after time 0, a frequency which is almost the same as the frequency of RF burst 12 and to thereafter maintain that frequency until the aforementioned voltage decay occurs in T/H 28. A normal error tolerance of perhaps 0.1% between the input and output frequencies may occur.

As previously noted at time t, VCO 46 is not producing the exact frequency of RF burst 12 and for circuits which utilize the output signal from VCO 46 it is desired that VCO 46 produce at least the frequency of RF burst 12 as soon as possible after the receipt of the RF burst. Noise generator 40 causes the production of such a frequency by supplying a noise signal waveform to summing junction 32. The amplitude of the signal supplied by noise generator 40 when considered with other component parameters is such as to cause VCO 46 to produce a component of frequency equal to that of RF burst 12 as early as time t, even though as above noted, VCO 46 is not centered on the frequency of RF burst 12 at the time. The net effect is that as early as 0.075 microseconds VCO 46 is producing a signal which can be sent by circuitry not shown to an enemy radar unit (not shown) which originally sent the RF burst 12. The returned signal containing the frequency of RF burst 12, will confuse the enemy radar into believing it is receiving the return signal of RF burst 12.

After VCO 46 is producing approximately the same frequency signal as burst 12, about 0.5 microseconds after time 30, noise generator 40 is no longer needed and may be turned off or reduced in amplitude by means of a signal of appropriate polarity and amplitude on line 40a.

The signal from track and hold circuit 28 is also coupled to an analog-to-digital converter 34 which upon receipt of a signal from timing and control 20 (waveform 2L) produces a multiple bit digital readout at terminal 34b which may be utilized in any suitable manner to display the approximate frequency of the RF burst signal 12. Further timing and control 20 also produces a signal on line 20a which may be passed to the external system to which VCO 46 is coupled to tell the external equipment that an incoming signal has been received as well as the time when the signal produced by VCO 46 is sufficiently accurate to be utilized in producing a return signal to the equipment which generated RF burst 12. The signal appearing on line 20a will most likely be generated at the same time that the pulse is generated on line 28b though it can be set to any other desired time.

It will be realized that the various times and frequencies given in the above description of operation of the circuit of FIG. 1 are for purposes of example only. The actual values will be designed to suit the particular contemplated application.

What is claimed is:

1. A system for generating a relatively long duration output RF signal at the same frequency as a received relatively short duration input Rf signal having a leading edge and lasting at least until time T thereafter, comprising in combination:

first means responsive to said input signal for generating a first output signal of amplitude corresponding to the frequency of said input RF signal;

second means responsive to said first means first output signal for producing a first output signal corresponding to the amplitude of said first means first output signal until a time t after receipt by said first means of said input RF signal leading edge and for thereafter producing a second output signal corresponding to the amplitude of said first means first output signal at time t, where t≦T;

third means responsive to said first and second signals produced by said second means for producing said output RF signal, the frequency of which is ideally identical to the frequency of said input RF signal but, due to system tolerance, is usually not identical thereto;

fourth means responsive to said output RF signal from said third means after time, t, for applying said output frequency signal, rather than said input frequency signal, to said first means for causing it to produce a second output signal the amplitude of which corresponds to the frequency of said output RF signal; and error correcting means responsive to first means second output signal and second means second output signal for producing a difference signal and wherein said third means is responsive to said difference signal for correcting the frequency of said output RF signal to the frequency of said input RF signal.

2. The combination as set forth in claim 1, wherein said first means comprises a discriminator means responsive to said input RF signal for providing an output voltage signal, the amplitude of which corresponds to the frequency of said input signal.

3. The combination as set forth in claim 1, wherein said third means comprises an amplifier means coupled to receive signals from said second means and a voltage controlled oscillator coupled to said amplifier means for producing said output RF signal of frequency corresponding substantially to the voltage amplitude of input signal received at said amplifier means.

4. The combination as set forth in claim 1, wherein said error correcting means comprises a summing junction to which is applied the output signal from said first means and the output signal from said second means, said error correcting means also including an error amplifier responsive to the difference in amplitude of said signal supplied to said summing means for producing an error output signal, said error amplifier output signal being coupled to said third means in addition to said signals from said second means.

5. The combination as set forth in claim 1, further including means producing an alternating voltage signal of random period, and wherein said error correcting means is also responsive to said random period signal for producing said difference signal, said random period signal being of such amplitude to cause said error correcting means to produce said difference signal of such amplitude as to cause said third means to produce, after time t, said output RF signal having a frequency component equal to the frequency of said input RF signal.

6. The combination as set forth in claim 5, wherein said means producing said alternating voltage signal of random period comprises a noisy diode producing a white noise and an operational amplifier means for amplifying said white noise produced by said noisy diode.

7. The combination as set forth in claim 1, wherein said RF input signal where a leading edge, and where said system further includes a timing means responsive to said leading edge of said input signal for producing a pulse at time t, thereafter and wherein said pulse at time t, is applied to said second means for causing it to produce said second output signal.

8. The combination as set forth in claim 7, wherein said fourth means comprises a normally opened switch means responsive to said pulse from said timing means for closing and wherein said output RF signal from said third means is coupled to one terminal of said normally opened switch means, said first means also comprising a limiter means coupled to receive said RF input signal and coupled to a second terminal of said switch means for receiving said output RF signal when said switch means is closed and for receiving said input RF signal when said switch means is opened.

9. The combination as set forth in claim 1, or 7, wherein said second means is a track and hold means which tracks said first means first output signal until said time t, and which thereafter hold the signal tracked at time t.

10. A system for generating a relatively long duration of output RF signal at the same frequency as a received relatively short duration input RF signal, having a leasing edge and lasting at least until time T, after said leading edge, comprising in combination:

first means responsive to said input signal for generating a first output signal of amplitude corresponding to the frequency of said input RF signal;

second means responsive to said first means first output signal for producing a first output signal corresponding to the amplitude of said first means first output signal until a time t after receipt by said first means of said input RF signal leading edge and for thereafter producing a second output signal corresponding to the amplitude of said first means first output signal at time t, where $t \leq T$;

third means responsive to said first and second signals produced by said second means for producing said output RF signal, the frequency of which is ideally identical to the frequency of said input RF signal, but which, due to system tolerance is usually not identical thereto;

fourth means responsive to said output RF signal from said third means after time t, for applying said output frequency signal, rather than said input frequency signal to said first means for causing it to produce a second output signal the amplitude of which corresponds to the frequency of said output RF signal;

fifth means producing alternating voltage signal of random period and given amplitude;

summing means responsive to said first means second output signal and second means second output signal and alternating voltage signal of random period for producing an error signal which is the difference of the first and second means output signals altered by the value of said random period signal; and wherein said third means is also responsive to said error signal for producing said output RF signal, which, after some time, which is greater than time T, is identical to said input RF signal and which after time t, produces said output RF signal having a component value which is identical to the frequency of said input RF signal.

* * * * *

UNITED STATES PATENT AND TRADEMARK OFFICE
CERTIFICATE OF CORRECTION

PATENT NO. : 4,247,946

DATED : Jan. 27, 1981

INVENTOR(S): Daniel D. Mawhinney

It is certified that error appears in the above-identified patent and that said Letters Patent is hereby corrected as shown below:

Column 1, line 28, "," should be --.--.

Column 3, line 14, "1" should be deleted; the remaining sentence should not be italicized.

Column 4, lines 7-8, "voltages" should be --voltage--.

Column 4, line 9, "aixs" should be --axis--.

Column 7, lines 18-19 (Claim 7), "wherein said RF input signal where a leading edge, and" should be deleted.

Column 7, line 43, "leas-" should be -- lead- --.

Signed and Sealed this

Twenty-first Day of April 1981

[SEAL]

Attest:

RENE D. TEGTMEYER

Attesting Officer    Acting Commissioner of Patents and Trademarks